(12) United States Patent
Hirosumi et al.

(10) Patent No.: US 11,607,953 B2
(45) Date of Patent: Mar. 21, 2023

(54) VEHICLE CONTROL SYSTEM

(71) Applicant: SUBARU CORPORATION, Tokyo (JP)

(72) Inventors: Naohiko Hirosumi, Tokyo (JP); Satoshi Inoue, Tokyo (JP); Hiroyuki Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 36 days.

(21) Appl. No.: 17/405,584

(22) Filed: Aug. 18, 2021

(65) Prior Publication Data

US 2022/0055475 A1    Feb. 24, 2022

(30) Foreign Application Priority Data

Aug. 24, 2020  (JP) .............................. JP2020-141191

(51) Int. Cl.
*B60W 10/14*    (2012.01)
*B60K 23/08*    (2006.01)
(Continued)

(52) U.S. Cl.
CPC ......... *B60K 23/0808* (2013.01); *B60W 10/02* (2013.01); *B60W 10/06* (2013.01);
(Continued)

(58) Field of Classification Search
CPC ............... B60K 230/0808; B60K 6/52; B60K 2023/0841; B60W 10/06; B60W 10/08; B60W 10/14; B60W 20/40; B60W 2520/14; B60W 2540/18; B60W 2552/40; B60W 2710/12; B60W 2710/125; B60W 2710/06; B60W 30/18145; B60W 30/045
(Continued)

(56) References Cited

U.S. PATENT DOCUMENTS

2018/0281797 A1\*  10/2018  Berels ................ B60G 17/0165
2021/0284017 A1\*   9/2021  Tabata ................. B60W 10/119
2022/0227348 A1\*   7/2022  Aratake ............... B60W 20/30

FOREIGN PATENT DOCUMENTS

CN      110053476 A  \*  7/2019  ............. B60K 17/02
JP      2009-113570 A     5/2009
(Continued)

*Primary Examiner* — Roger L Pang
(74) *Attorney, Agent, or Firm* — Troutman Pepper Hamilton Sanders LLP

(57) ABSTRACT

A vehicle control system to be mounted in a hybrid electric vehicle includes an engine, a center differential that includes a front-wheel-side output portion and a rear-wheel-side output portion and distributes torque outputted from the engine to a front wheel and a rear wheel, a limited slip differential mechanism that limits a differential between the front-wheel-side output portion and the rear-wheel-side output portion, and a motor disposed in a drive-power transferring system that transfers drive power from the rear-wheel-side output portion to the rear wheel. The vehicle control system includes a processor. When the hybrid electric vehicle is switched from a first traveling mode to a second traveling mode, the processor stops the engine while causing the limited slip differential mechanism to limit the differential between the front-wheel-side output portion and the rear-wheel-side output portion.

14 Claims, 9 Drawing Sheets

(51) Int. Cl.
  *B60W 20/40* (2016.01)
  *B60W 10/02* (2006.01)
  *B60W 10/06* (2006.01)
  *B60W 10/08* (2006.01)

(52) U.S. Cl.
  CPC ............ *B60W 10/08* (2013.01); *B60W 10/14* (2013.01); *B60W 20/40* (2013.01); *B60K 2023/0841* (2013.01); *B60W 2520/14* (2013.01); *B60W 2540/18* (2013.01); *B60W 2552/35* (2020.02); *B60W 2552/40* (2020.02); *B60W 2710/06* (2013.01); *B60W 2710/0666* (2013.01); *B60W 2710/12* (2013.01); *B60W 2710/125* (2013.01)

(58) Field of Classification Search
  USPC .......................................................... 477/5
  See application file for complete search history.

(56) References Cited

FOREIGN PATENT DOCUMENTS

| JP | 2009-143292 A |   | 7/2009 |
|----|---------------|---|--------|
| JP | 2021142883 A  | * | 9/2021 |

* cited by examiner

VEHICLE SPEED: 10 KM/H

| | | ACCELERATOR POSITION | | |
|---|---|---|---|---|
| | | 1/4 | 1/2 | 1/1 |
| RUDDER ANGLE | 0° | 50% | 65% | 80% |
| | 180° | 25% | 40% | 55% |
| | 360° | 1% | 15% | 30% |

FIG. 6A

VEHICLE SPEED: 60 KM/H

| | | ACCELERATOR POSITION | | |
|---|---|---|---|---|
| | | 1/4 | 1/2 | 1/1 |
| RUDDER ANGLE | 0° | 30% | 45% | 60% |
| | 180° | 5% | 25% | 35% |
| | 360° | 1% | 5% | 15% |

FIG. 6B

VEHICLE CONTROL SYSTEM

CROSS-REFERENCE TO RELATED APPLICATION

The present application claims priority from Japanese Patent Application No. 2020-141191 filed on Aug. 24, 2020, the entire contents of which are hereby incorporated by reference.

BACKGROUND

The technology relates to a vehicle control system to be mounted in a hybrid electric vehicle that drives front wheels using the engine and rear wheels using the motor. For example, the technology relates to a technical field of torque distribution control between the front wheels and the rear wheels in accordance with switching between the hybrid electric vehicle (HEV) mode and the EV mode.

P4 hybrid electric vehicles (HEV) are known that drives front wheels using the engine and rear wheels using the motor (rear motor). Such a P4 HEV is switchable between a front-wheel drive state and the all-wheel drive state depending on whether the rear motor is used or not. Further, the P4 HEV achieves the all-wheel drive state without using a propeller shaft that transfers drive power from the engine to the rear wheels.

For example, Japanese Unexamined Patent Application Publication (JP-A) Nos. 2009-113570 and 2009-143292 disclose a vehicle including an engine and a motor that drives the rear wheels. The vehicle transfers the engine output and the motor output to both of the front wheels and the rear wheels using a propeller shaft and a transfer that includes a center differential and a limited slip differential (LSD).

SUMMARY

An aspect of the technology provides a vehicle control system to be mounted in a hybrid electric vehicle. The hybrid electric vehicle includes: an engine; a center differential including a front-wheel-side output portion and a rear-wheel-side output portion and configured to distribute torque outputted from the engine to a front wheel and a rear wheel; a limited slip differential mechanism configured to limit a differential between the front-wheel-side output portion and the rear-wheel-side output portion; and a motor disposed in a drive-power transferring system configured to transfer drive power from the rear-wheel-side output portion to the rear wheel. The vehicle control system includes a processor. When the hybrid electric vehicle is switched from a first traveling mode in which the engine and the motor are both used as drive sources to a second traveling mode in which only the motor out of the engine and the motor is used as a drive source, the processor is configured to stop the engine while causing the limited slip differential mechanism to limit the differential between the front-wheel-side output portion and the rear-wheel-side output portion.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 6A is a map for explaining an exemplary method of calculating a required front-rear torque distribution value.

FIG. 6B is a map for explaining the exemplary method of calculating the required front-rear torque distribution value.

DETAILED DESCRIPTION

A P4 hybrid electric vehicle that includes no propeller shaft is brought into the all-wheel drive state while traveling in the HEV mode, and in the rear-wheel drive state while traveling in the EV mode. That is, when switching from the HEV mode to the EV mode, the P4 hybrid electric vehicle switches from the all-wheel drive state to the rear-wheel drive state accordingly.

The switching of the drive state from the HEV mode to the EV mode can make the driver feel strange on drivability. For example, the driver is likely to feel strange when the vehicle is switched from the all-wheel drive state to the rear-wheel drive state in accordance with switching from the HEV mode to the EV mode while traveling on a curved road.

It is desirable to suppresses a decrease in drivability of a hybrid electric vehicle that drives the rear wheels using the motor, at the time of switching from the HEV mode to the EV mode.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
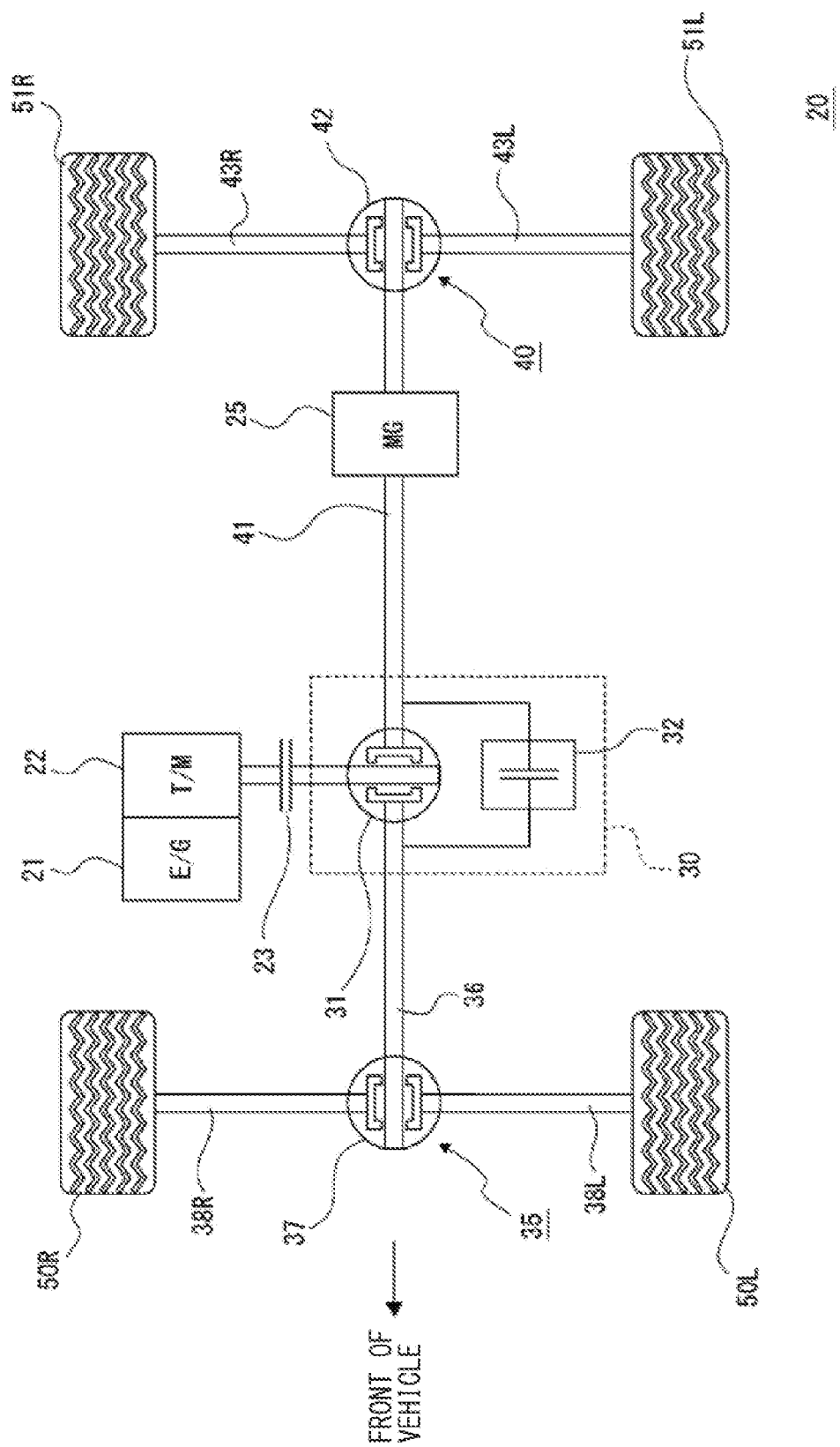
FIG. 1 is a schematic diagram illustrating an exemplary configuration of a vehicle according to one example embodiment of the technology.
Figure 2:
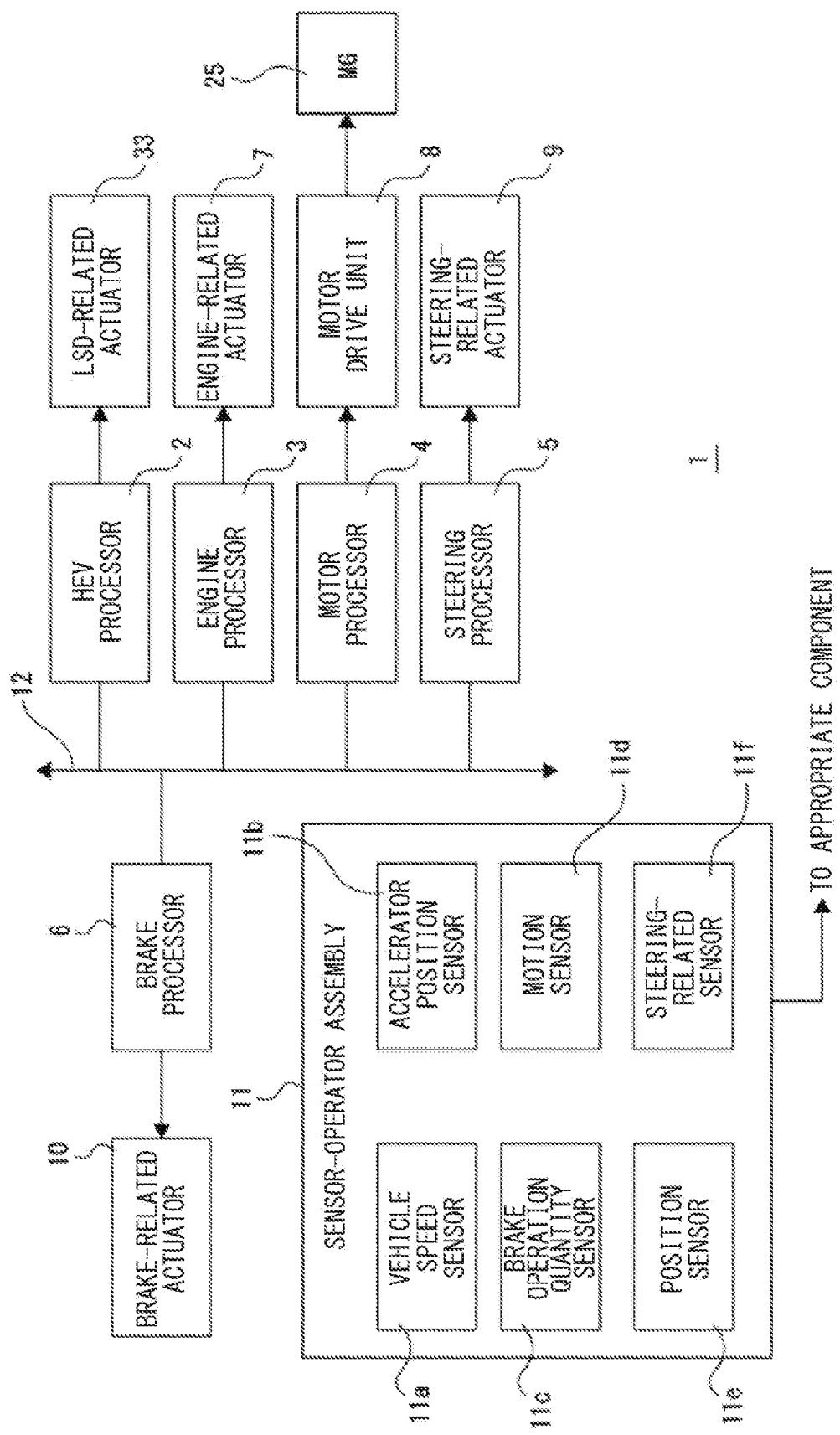
FIG. 2 is a block diagram illustrating an exemplary configuration of a vehicle control system according to one example embodiment of the technology.

FIG. 1 schematically illustrates an exemplary mechanical configuration of a vehicle 20 according to an example embodiment of the technology. FIG. 2 is a block diagram of an exemplary configuration of a vehicle control system 1 in the vehicle 20 according to the example embodiment of the technology.

As illustrated in FIG. 1, the vehicle 20 may include an engine (E/G) 21, a transmission (T/M) 22, a clutch mechanism 23, a motor generator (MG) 25, a transfer 30, a front-wheel drive-power transferring mechanism 35, a rear-wheel drive-power transferring mechanism 40, front wheels 50, and rear wheels 51. Herein, left and right components in a pair may be respectively denoted with reference numerals followed by "L" and "R".

The engine 21 may be an internal-combustion engine, such as a gasoline engine or a diesel engine, for example. The engine 21 may be a power source that causes the vehicle to travel. The vehicle 20 according to the present example embodiment may be a hybrid electric vehicle (HEV) that includes the engine 21 and the motor generator 25 as drive sources for the drive wheels, namely, the front wheels 50 and the rear wheels 51.

The transmission 22 may control the output of the engine 21 while transferring the output to the drive wheels. For example, the transmission 22 may include a torque converter serving as a fluid joint between the transmission 22 and the engine 21. The transmission 22 may be an automatic transmission that includes a multiple-row planetary gear set provided on an output side of the torque converter.

The clutch mechanism 23 may be interposed in a drive-power transferring system between the transmission 22 and the transfer 30. The clutch mechanism 23 may be configured to block the power transmission between the transmission 22 and the transfer 30. That is, the power transmission may be enabled between the transmission 22 and the transfer 30 while the clutch mechanism 23 is being engaged, whereas the power transmission may be disabled between the transmission 22 and the transfer 30 while the clutch mechanism 23 is being released.

The transfer 30 may distribute the power received from the engine 21 via the clutch mechanism 23 to the front-wheel drive-power transferring mechanism 35 and the rear-wheel drive-power transferring mechanism 40. The transfer 30 includes a center differential 31 and a limited slip differential (LSD) 32. The LSD 32 may limit the differential motion of the center differential 31.

The center differential 31 may be a composite planetary gear differential, for example. The center differential 31 may absorb the speed difference between the front wheels 50 and the rear wheels 51 and distribute the drive power between the front wheels 50 and the rear wheels 51 at a predetermined ratio. The torque distribution between the front wheels and the rear wheels may be performed by the center differential 31 on the basis of the gear ratio of the planetary gear. In a case where the vehicle 20 is traveling in a condition where there is substantially no speed differential between the front wheels 50 and the rear wheels 51, the center differential 31 may perform the torque distribution at the ratio of 45:55 (front wheels:rear wheels), for example.

The LSD 32 restricts or limits the differential between a front-wheel-side output portion and a rear-wheel-side output portion of the center differential 31. In this example, the LSD 32 may be of a hydraulically-driven multiple-disc clutch type. For example, the LSD 32 may include a wet multiple disc clutch and a piston that presses the wet multiple disc clutch to generate differential limiting force. The LSD 32 may be configured to change the degree of engagement of the multiple disc clutch. Changing the degree of engagement of the multiple disc clutch changes the force to limit the differential between the front-wheel-side output portion and the rear-wheel-side output portion of the center differential 31.

In this example, while the multiple disc clutch is being released, the LSD 32 may be brought into a non-limiting state and refrain from limiting the differential between the front-wheel-side output portion and the rear-wheel-side output portion of the center differential 31. The torque may be distributed between the front wheels and the rear wheels at a ratio (e.g., 45:55) based on the gear ratio of the planetary gear.

In contrast, while the multiple disc clutch is being engaged, the LSD 32 may limit the differential between the front-wheel-side output portion and the rear-wheel-side output portion of the center differential 31, the torque distribution may thus change from the one based on the gear ratio of the planetary gear. For example, in a case where the front-wheel-side output portion and the rear-wheel-side output portion of the center differential 31 are directly coupled to each other when the degree of engagement of the multiple disc clutch becomes maximum, the output torque of the engine 21 may be distributed between the front wheels and the rear wheels at a ratio of 50:50.

The front-wheel drive-power transferring mechanism 35 may transfer the output from the front-wheel-side output portion of the center differential 31 to the front wheels 50. The front-wheel drive-power transferring mechanism 35 may include an input shaft 36, a front differential 37, and a drive shaft 38.

The input shaft 36 may be a rotary shaft that transfers the output from the front-wheel-side output portion of the center differential 31 to the front differential 37.

The front differential 37 may distribute the input received from the input shaft 36 between the left front wheel 50L and the right front wheel 50R. The front differential 37 may include a differential mechanism that absorbs the rotational speed difference between the left front wheel 50L and the right front wheel 50R while rotating, for example.

The drive shaft 38 may include a pair of a left drive shaft 38L and a right drive shaft 38R. The left drive shaft 38L may transfer the drive force from a left output portion of the front differential 37 to the left front wheel 50L. The right drive shaft 38R may transfer the drive force from a right output portion of the front differential 37 to the right front wheel 50R.

The rear-wheel drive-power transferring mechanism 40 may transfer the output from the rear-wheel-side output portion of the center differential 31 to the rear wheels 51. The rear-wheel drive-power transferring mechanism 40 may include a propeller shaft 41, a rear differential 42, and a drive shaft 43.

The propeller shaft 41 may be a rotary shaft that transfers the output from the rear-wheel-side output portion of the center differential 31 to the rear differential 42.

The rear differential 42 may include a differential mechanism that distributes the input received from the propeller shaft 41 between the left rear wheel 51L and the right rear wheel 51R and absorbs the rotational speed difference between the left rear wheel 51L and the right rear wheel 51R while rotating, for example.

The drive shaft 43 may include a pair of a left drive shaft 43L and a right drive shaft 43R. The left drive shaft 43L may transfer the drive force from a left output portion of the rear differential 42 to the left rear wheel 51L. The right drive shaft 43R may transfer the drive force from a right output portion of the rear differential 42 to the right rear wheel 51R.

The motor generator 25 may be a rotating electrical machine, such as a synchronous motor, and interposed in a drive-power transferring system between the rear-wheel-side output portion of the center differential 31 and the rear wheels 51. The motor generator 25 may serve as a motor and a power generator. In this example, the motor generator 25 may be disposed on the propeller shaft 41 of the rear-wheel drive-power transferring mechanism 40. When serving as a motor, the motor generator 25 may assist driving of the left rear wheel 51L and the right rear wheel 51R by driving the propeller shaft 41. In contrast, when serving as a power generator, the motor generator 25 may absorb the torque transferred from the left rear wheel 51L and the right rear wheel 51R to the propeller shaft 41 as regenerative electric energy.

The front wheels 50 may be driven by the drive shaft 38, and the rear wheels 51 may be driven by the drive shaft 43. The front wheels 50 and the rear wheels 52 may be rotatably supported with non-illustrated hub bearing housings. The hub bearing housings may each be provided with a vehicle speed sensor (drive wheel speed sensor) 11a that detects the revolution speed of the front wheels 50 or the rear wheels 51. The vehicle speed sensor 11a is to be described later.

The hub bearing housings may be supported by the vehicle body with non-illustrated suspensions.

Next, the vehicle control system 1 in the vehicle 20 is described with reference to FIG. 2.

In FIG. 2, the vehicle control system 1 may include an HEV processor 2, an engine processor 3, a motor processor 4, a steering processor 5, a brake processor 6, an engine-related actuator 7, a motor drive unit 8, a steering-related actuator 9, a brake-related actuator 10, a sensor-operator assembly 11, and a bus 12.

Note that the motor generator 25 illustrated in FIG. 1 is also illustrated in FIG. 2.

The processors in the vehicle control system 1 including the HEV processor 2, the engine processor 3, the motor processor 4, the steering processor 5, and the brake processor 6 may each include a microcomputer including, for example, a central processing unit (CPU), a read only memory (ROM), or a random access memory (RAM), for example. These processors may be configured to establish mutual data communication via the bus 12.

The sensor-operator assembly 11 may collectively indicate various sensors and operators in the vehicle 20 (hereinafter also referred to as an own vehicle). Examples of the sensors in the sensor-operator assembly 11 may include a vehicle speed sensor (drive wheel speed sensor) 11a that detects the own vehicle speed, an accelerator position sensor 11b that detects the accelerator position on the basis of the stepping quantity of the accelerator pedal, a brake operation quantity sensor 11c that detects the operation amount (the stepping quantity) of the brake pedal, a motion sensor 11d that includes, for example, an acceleration sensor (e.g., a triaxial acceleration sensor) and an angular sensor (e.g., a yaw rate sensor) and detects the motion of the own vehicle, and a position sensor 11e, such as a global navigation satellite system (GNSS) sensor, that detects a current position of the vehicle 20.

Examples of the sensors in the sensor-operator assembly 11 may further include a steering-related sensor 11f. The steering-related sensor 11f may collectively indicate various sensors relevant to steering, such as a rudder angle sensor that detects the rudder angle of the wheel (e.g., the front wheels 50) and a steering angle sensor that detects the steering angle of the steering wheel.

Although not illustrated, the sensor-operator assembly 11 may further include other sensors, such as an engine revolution sensor that detects the revolution number of the engine, an intake air flow sensor that detects the amount of air taken into the engine, a throttle position sensor that detects the position of a throttle valve disposed in the air intake passage to regulate the intake air flow to be supplied to each cylinder of the engine, a coolant temperature sensor that detects a coolant temperature indicative of the temperature of the engine, an outside air temperature sensor that detects the temperature outside the vehicle, and a gradient sensor that detects the gradient of a traveling road on which the own vehicle is traveling.

Example of the operators in the sensor-operator assembly 11 may include a start switch that sends a command to start or stop the vehicle control system 1, and an operator that send a command to turn on/off a headlamp or a turn signal lamp.

Although not illustrated, in this example, the vehicle control system 1 may calculate a drive wheel speed and a vehicle body speed on the basis of the revolution speed of each drive wheel detected by the vehicle speed sensor 11a. The drive wheel speed and the vehicle body speed may be index values indicating the speed of the vehicle body. The drive wheel speed may be calculated on the basis of the revolution speed of the drive wheels and the outer diameters of the drive wheels. When any of the drive wheels is in a slipping state (idling state), there may be a relatively large difference between the drive wheel speed and an actual vehicle body speed. In other words, the drive wheel speed may accurately indicate the actual vehicle body speed when the drive wheels are not in the slipping state.

The vehicle body speed may be calculated on the basis of data on the acceleration rate, the accelerator position, the transmission gear ratio, the steering angle, and so forth, as well as the revolution speed of the drive wheels. This reduces the difference between the drive wheel speed and the actual vehicle body speed when any of the drive wheels is in the slipping state. The vehicle body speed may be calculated on the basis of these data items through various known methods that have been proposed. Further, data items used to calculate the vehicle body speed should not be limited to those described above. Alternatively, only some of the data items described above may be used, or another data item not described above may be used together with the data items described above.

The drive wheel speed and the vehicle body speed may be calculated by any of the HEV processor 2, the engine processor 3, the motor processor 4, the steering processor 5, and the brake processor 6. Alternatively, the drive wheel speed and the vehicle body speed may be calculated by another non-illustrated processor other than these processors.

The HEV processor 2 may control the movement of the vehicle by sending commands to the engine processor 3 and the motor processor 4 on the basis of a detection signal received from a predetermined sensor in the sensor-operator assembly 11 and operational input data received from a predetermined operator in the sensor-operator assembly 11.

The HEV processor 2 may calculate target drive force on the basis of an accelerator operation or a brake operation performed by a driver. Herein, the target drive force may have a different polarity, namely, a positive value or a negative value, depending on whether the own vehicle is to be accelerated or decelerated. For example, the target drive force may take a positive value if the own vehicle is to be accelerated, whereas a negative value if the own vehicle is to be decelerated.

In this example, the HEV processor 2 may calculate required drive force and required brake fluid pressure on the basis of the calculated target drive force. The required drive force may be drive force of the vehicle 20 required to satisfy the target drive force. In this example in which the vehicle 20 includes the engine 21 and the motor generator 25 as drive sources for the drive wheels, the target drive force may correspond to the total drive force of the engine 21 and the motor generator 25.

The required brake fluid pressure may be a brake fluid pressure required to satisfy the target drive force.

The vehicle 20, which is a hybrid electric vehicle, may include brake systems: a hydraulic brake mechanism, such as a disc brake, and a regenerative brake mechanism utilizing regenerative power of the motor generator 25. Thus, when the vehicle 20 is to be decelerated, not only the required brake fluid pressure but also the required drive force may be calculated so that the vehicle 20 will be decelerated on the basis of the calculated target drive force.

On the basis of the calculated required drive force, the HEV processor 2 may calculate required engine drive force required to drive the engine 21 and required motor drive force required to drive the motor generator 25. The HEV processor 2 may then send a command about the required engine drive force to the engine processor 3, and a command about the required motor drive force to the motor processor 4.

Further, the HEV processor 2 may control switching between the HEV mode and the EV mode. In the HEV mode, both of the engine 21 and the motor generator 25 may be used as drive sources. In one embodiment, the HEV mode may serve as a "first traveling mode". In the EV mode, only the motor generator 25 out of the engine 21 and the motor generator 25 may be used as a drive source. In one embodiment, the EV mode may serve as a "second traveling mode". The control of switching between the HEV mode and the EV mode may be performed on the basis of at least the vehicle speed and the required drive force.

Note that, in this example, the vehicle speed used in the control performed by the HEV processor 2 may be either one of the vehicle speed (drive wheel speed) detected by the vehicle speed sensor 11a and the vehicle body speed.

Further, in this example, the HEV processor 2 may control an LSD-related actuator 33. The LSD-related actuator 33 may include an actuator that controls the hydraulic pressure of the multiple disc clutch in the LSD 32 described above. The HEV processor 2 may control driving of the actuator to control the operation of the LSD 32 that limits the differential between the front-wheel-side output portion and the rear-wheel-side output portion of the center differential 31 illustrated in FIG. 1.

In this example, the HEV processor 2 may control the operation of the LSD 32 that limits the differential when the HEV mode is switched to the EV mode, which is described later.

On the basis of the command about the required engine drive force received from the HEV processor 2, the engine processor 3 may control various actuators in the engine-related actuator 7. Examples of the engine-related actuators in the engine-related actuator 7 may include a throttle actuator that drives a throttle valve, and an injector that injects a fuel.

The engine processor 3 may control the engine output by controlling a fuel injection timing, a pulse width of fuel injection, a throttle position, and so forth. The engine processor 3 may also control starting or stopping the engine.

The motor processor 4 may control the operation of the motor generator 25 by controlling the motor drive unit 8 on the basis of the command about the required motor drive force received from the HEV processor 2. The motor drive unit 8 may be electric circuitry including a drive circuit for the motor generator 25.

When the motor generator 25 needs to perform power running, the motor processor 4 may send the motor drive unit 8 a command based on the required motor drive force to cause the motor generator 25 to perform power running. When the motor generator 25 needs to perform a regenerative rotation, the motor processor 4 may send the motor drive unit 8 a command based on the required motor drive force to cause the motor generator 25 to perform the regenerative rotation.

The steering processor 5 may control various actuators in the steering-related actuator 9 on the basis of detection signals received from predetermined sensors in the sensor-operator assembly 11. Examples of the actuators in the steering-related actuator 9 may include an electric power steering (EPS) motor provided in the steering mechanism of the vehicle 20.

For example, the steering processor 5 may perform power steering control that assists the steering torque by controlling the EPS motor on the basis of the data on the rudder angle or the steering wheel angle detected by the steering-related sensor 1 lf described above.

The brake processor 6 may control various actuators in the brake-related actuator 10 on the basis of detection signals received from predetermined sensors in the sensor-operator assembly 11 and operational input data received from the operators in the sensor-operator assembly 11. Examples of the actuators in the brake-related actuator 10 may include a hydraulic pressure control actuator that controls the hydraulic pressure output from a brake booster to a master cylinder and the hydraulic pressure in a brake fluid pipe. The brake processor 6 may achieve so-called antilock brake system (ABS) control by controlling the hydraulic pressure using the hydraulic pressure control actuator on the basis of the slip ratio of the drive wheels calculated on the basis of the drive wheel speed and the vehicle body speed described above. Further, the brake processor 6 may perform brake control by controlling the hydraulic pressure control actuator on the basis of the command about the required brake fluid pressure received from the HEV processor 2.

The slip ratio may be calculated by the following expression: {(vehicle body speed−drive wheel speed)/vehicle body speed×100%}. A slip ratio of zero (0) may indicate that the drive wheels are not in the slipping state. A slip ratio of 100 may indicate that the drive wheels are in a locked state. When the drive wheel speed is greater than the vehicle body speed (i.e., the drive wheel speed>the vehicle body speed), the slip ratio may take a negative value, which indicates that the drive wheels are idling in the slipping state.

Note that the exemplary configuration of the vehicle control system 1 described above is a mere example. The sensor-operator assembly 11 may further include, for example, a camera or an image sensor to identify the condition outside the vehicle 20 and the condition inside the vehicle 20. The vehicle control system 1 may further include a communicator that establishes data communication with external devices, such as a computer device mounted on another vehicle.

The P4 hybrid electric vehicle, which drives the front wheels using the engine and the rear wheels using the motor, may be brought into the all-wheel drive state in the HEV mode, and the rear-wheel drive state in the EV mode. Thus, when the vehicle 20 is switched from the HEV mode to the EV mode, the all-wheel drive state may be switched to the rear-wheel drive state accordingly. Such switching from the all-wheel drive state to the rear-wheel drive state in accordance with switching from the HEV mode to the EV mode can make the driver feel strange on drivability.

In the present example embodiment addressing such a concern, when the vehicle 20 is switched from the HEV mode to the EV mode, the engine is stopped while the limited slip differential mechanism is limiting the differential between the front-wheel-side output portion and the rear-wheel-side output portion of the center differential 31.

An exemplary drive-state switching control according to the present example embodiment will now be described with reference to FIGS. 3 to 5.

Figure 3:
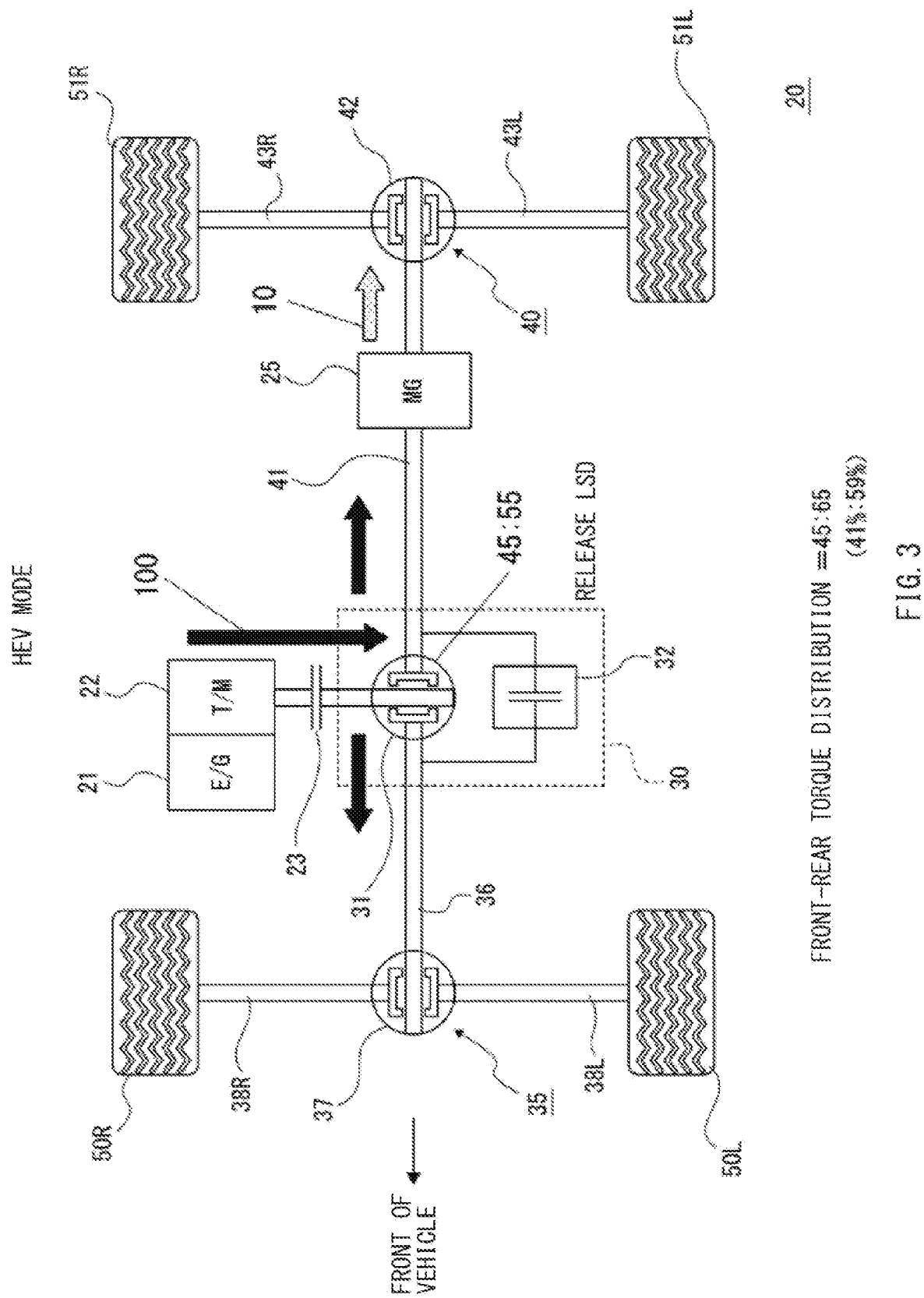
FIG. 3 is a diagram schematically illustrating a torque flow in the HEV mode.

FIG. 3 schematically illustrates an exemplary torque flow in the HEV mode. In FIG. 3 and other drawings illustrating torque flows, the torque from the engine 21 is indicated by a black arrow, and the torque from the motor generator 25 is indicated by a dotted arrow.

As illustrated in FIG. 3, the vehicle 20 may be brought into the all-wheel drive state in the HEV mode by releasing the LSD 32 of the transfer 30, transferring the torque from the engine 21 to both of the front wheels 50 and the rear wheels 51, and transferring the torque from the motor generator 25 only to the rear wheels 51. In this case, the transfer 30 may perform the torque distribution between the front wheels 50 and the rear wheels 51 (hereinafter simply referred to as front-rear torque distribution) on the basis of the gear ratio of the planetary gear in the center differential 31, as described above. In this example, the front-rear torque distribution may be performed at a ratio of 45:55 (front wheels:rear wheels).

In this case, assuming that the torque from the engine 21 is "100" and that the torque from the motor generator 25 is "10" as illustrated in FIG. 3, the comprehensive front-rear torque distribution may be 45:65 (41%:59%) in the HEV mode.

Figure 4:
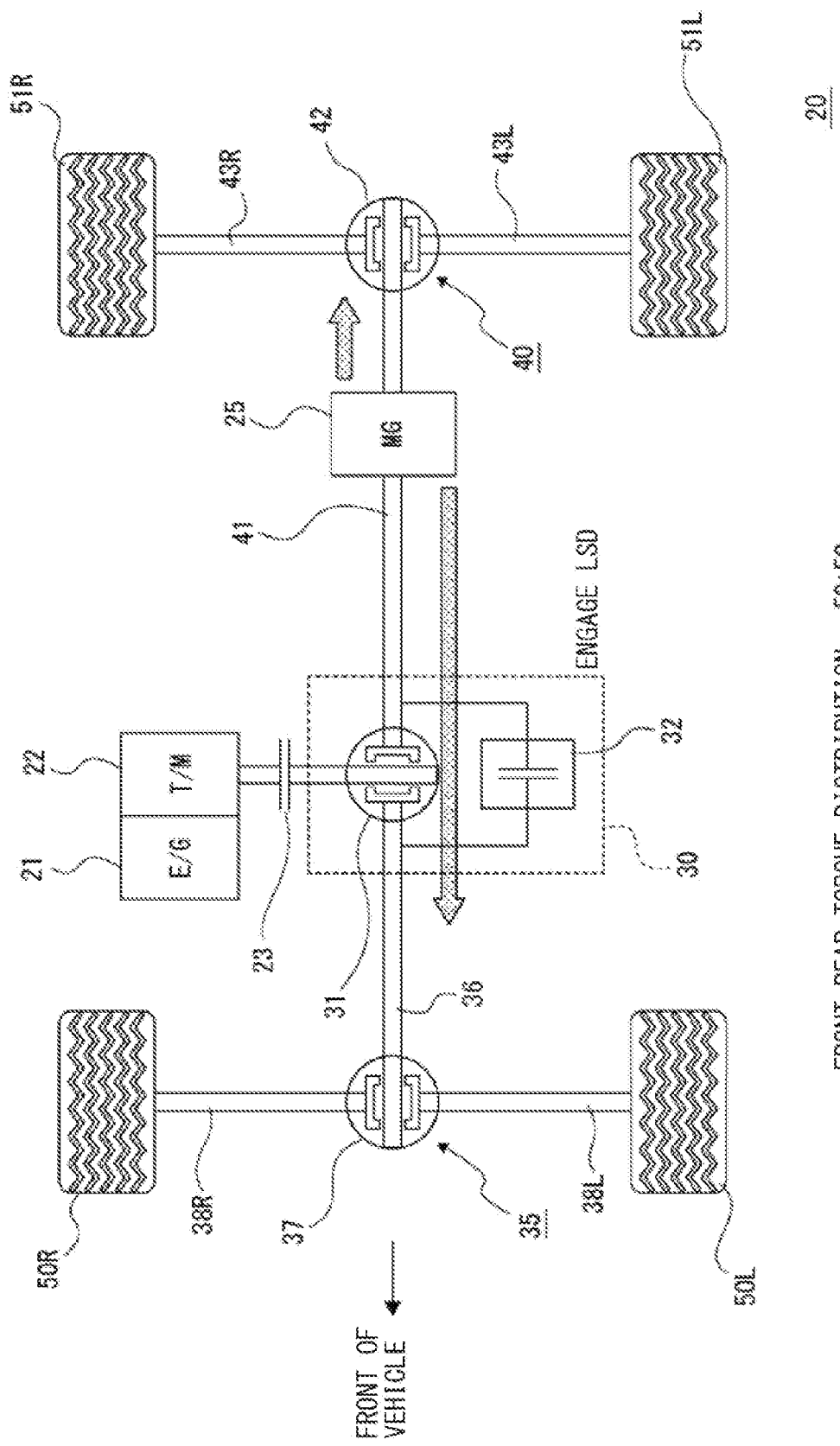
FIG. 4 is a diagram schematically illustrating a torque flow at the time of switching from the HEV mode to the EV mode.

FIG. 4 schematically illustrates an exemplary torque flow at the time of switching from the HEV mode to the EV mode.

When the vehicle 20 is switched from the HEV mode to the EV mode, the LSD 32 may be switched from the released state to the engaged state to limit the differential between the front-wheel-side output portion and the rear-wheel-side output portion of the center differential 31. In this example, the LSD 32 may be brought into a completely engaged state (i.e., engaged at a maximum degree of engagement) to directly couple the front-wheel-side output portion and the rear-wheel-side output portion of the center differential 31. Thereafter, the engine 21 may be stopped.

Accordingly, when the engine 21 is stopped after the vehicle 20 is switched from the HEV mode to the EV mode (i.e., when the vehicle 20 is driven only by the motor generator 25), the front-rear torque distribution becomes 50:50. This helps prevent the vehicle 20 from being switched from the all-wheel drive state to the rear-wheel drive state when being switched from the HEV mode to the EV mode. That is, the vehicle 20 is maintained in the all-wheel drive state even when switched from HEV mode to the EV mode.

Accordingly, it is possible to suppress a decrease in drivability at the time of switching from the HEV mode to EV mode.

Figure 5:
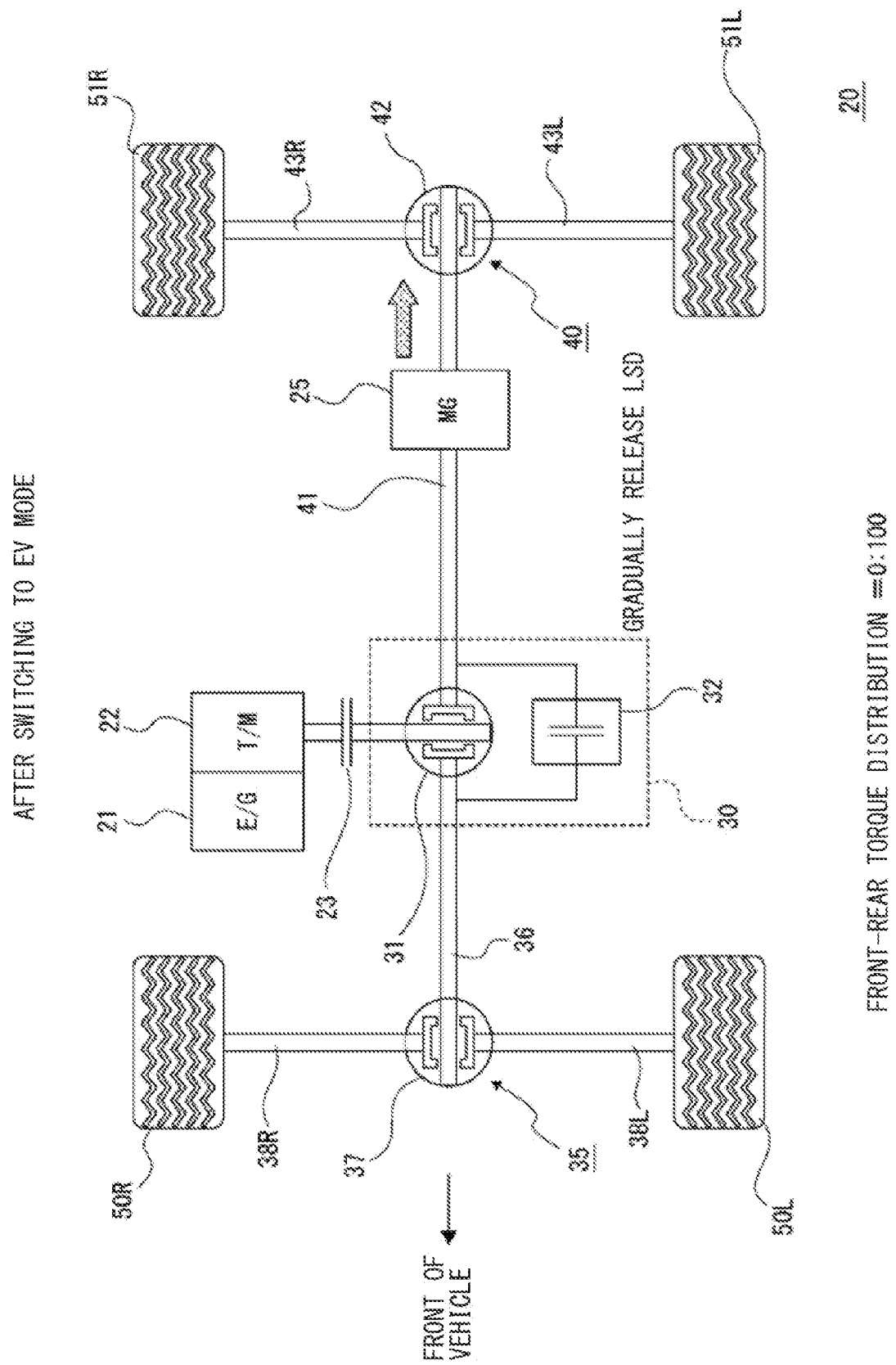
FIG. 5 is a diagram schematically illustrating a torque flow after the vehicle is switched to the EV mode.

FIG. 5 schematically illustrates an exemplary torque flow after the vehicle 20 is switched to the EV mode.

According to the present example embodiment, the LSD 32 may be gradually released after the vehicle 20 is switched to the EV mode. As a result, the front-rear torque distribution may become 0:100. That is, the vehicle 20 may be brought into the rear-wheel drive state. Hereinafter, the drive-state switching control from the all-wheel drive state to the rear-wheel drive state may be referred to as "rear-wheel drive switching control".

In this example, the rear-wheel drive switching control may be performed on the basis of the result of an estimation of a road surface condition and a required front-rear torque distribution value.

The result of the estimation of the road surface condition may be represented by an estimated value of the friction coefficient μ of the road surface (hereinafter referred to as road surface μ). The road surface μ may be an index value of the skid resistance of the road surface. The road surface μ may be calculated by dividing the frictional force generated between the tire and the road surface by the load of the tire.

In this example, the road surface μ may be estimated by various known methods that have been proposed. For example, the road surface μ may be estimated on the basis of the slip ratio described above. Alternatively, the road surface μ may be estimated using a front-wheel friction circle utilization ratio estimated on the basis of the yaw rate and the lateral acceleration rate, as disclosed in JP-A No. 2008-265467.

The required front-rear torque distribution value may be a value required in the distribution of the torque between the front wheels and the rear wheels. In this example, the required front-rear torque distribution value may be calculated by the HEV processor 2 on the basis of data indicating the traveling state of the vehicle 20. For example, the HEV processor 2 may calculate the required front-rear torque distribution value on the basis of the vehicle speed, the rudder angle, and the required drive force.

An exemplary method of calculating the required front-rear torque distribution value will now be described with reference to FIGS. 6A and 6B.

As illustrated in FIGS. 6A and 6B, a map indicating a rear-wheel drive power distribution (%) for each combination of an accelerator position and a rudder angle may be prepared for each vehicle speed. FIG. 6A illustrates a map for a vehicle speed of 10 km/h, and FIG. 6B illustrates a map for a vehicle speed of 60 km/h. In this case, the map illustrated in FIG. 6A may be used when the vehicle speed is within a range from 10 km/h to 59 km/h, while the map illustrated in FIG. 6B may be used when the vehicle speed is within a range from 60 km/h to a predetermined speed.

As to the accelerator position, "¼" may indicate an accelerator position within a range from 0 (zero) to ¼, "½" may indicate an accelerator position greater than ¼ and less than ¾, and "1/1" may indicate an accelerator position within a range from ¾ to 1/1, for example. As to the rudder angle, "0°" may indicate a rudder angle within a range from 0° to 120°, "180°" may indicate a rudder angle within a range from 121° to 240°, and "360°" may indicate a rudder angle within a range from 241° to 360°, for example.

Note that the divisions of the vehicle speed, the accelerator position, and the rudder angle described above are mere non-limiting examples. The vehicle speed, the accelerator position, and the rudder angle may be divided into another number of ranges on the basis of another numerical boundaries.

The HEV processor 2 may calculate the required front-rear torque distribution value using the map of the rear-wheel drive power distribution on the basis of the vehicle speed, the rudder angle, and the required drive force. For example, the rear-wheel drive power distribution is 65% in a case where the vehicle speed is 30 km/h, the accelerator position is ½, and the rudder angle is 30°. Thus, the required front-rear torque distribution value is set to be 35:65.

On the basis of the required front-rear torque distribution value calculated as described above and the estimated value of the road surface μ, the HEV processor 2 may determine whether to perform the rear-wheel drive switching control (hereinafter referred to as a rear-wheel drive switching determination). For example, the HEV processor 2 may determine whether the rear-wheel drive power distribution (%) required to satisfy the required front-rear torque distribution value is greater than or equal to a predetermined value and whether the estimated value of the road surface μ is greater than or equal to a predetermined value in the rear-wheel drive switching determination. For instance, the HEV processor 2 may determine to perform the rear-wheel drive switching control under the condition that the rear-wheel drive power distribution is 30% or greater and that the estimated value of the road surface μ is 0.7 or greater (where a minimum value of the road surface μ is 0.0).

In this example, after performing the rear-wheel drive switching control, the HEV processor 2 may determine whether to maintain the rear-wheel drive state (hereinafter referred to as a rear-wheel drive maintaining determination) on the basis of the required front-rear torque distribution value and the estimated value of the road surface μ. The HEV processor 2 may perform the rear-wheel drive maintaining determination in the same manner as the rear-wheel drive switching determination. In this example, the HEV processor 2 may determine to maintain the rear-wheel drive state under the condition that the rear-wheel drive power distribution is 30% or greater and that the estimated value of the road surface μ is 0.7 or greater.

If it is determined in the rear-wheel drive maintaining determination that the rear-wheel drive state is to be maintained, the HEV processor 2 may maintain the rear-wheel drive state. In this example, the HEV processor 2 may keep the LSD 32 in the released state to maintain the front-rear torque distribution at 0:100.

In contrast, if it is not determined that the rear-wheel drive state is to be maintained, the HEV processor 2 may switch the vehicle 20 from the rear-wheel drive state to the all-wheel-drive state. For example, the HEV processor 2 may increase the degree of engagement of the LSD 32 so that the differential between the front-wheel-side output portion and the rear-wheel-side output portion of the center differential 31 is limited and that the torque is distributed from the motor generator 25 also to the front wheels 50. In this example, the LSD 32 may be brought into the completely engaged state to directly couple the front-wheel-side output portion and the rear-wheel-side output portion of the center differential 31. As a result, the front-rear torque distribution may become 50:50.

An exemplary process for the drive-state switching control according to the example embodiment described above will now be described with reference to flowcharts in FIGS. 7 and 8.

Figure 7:
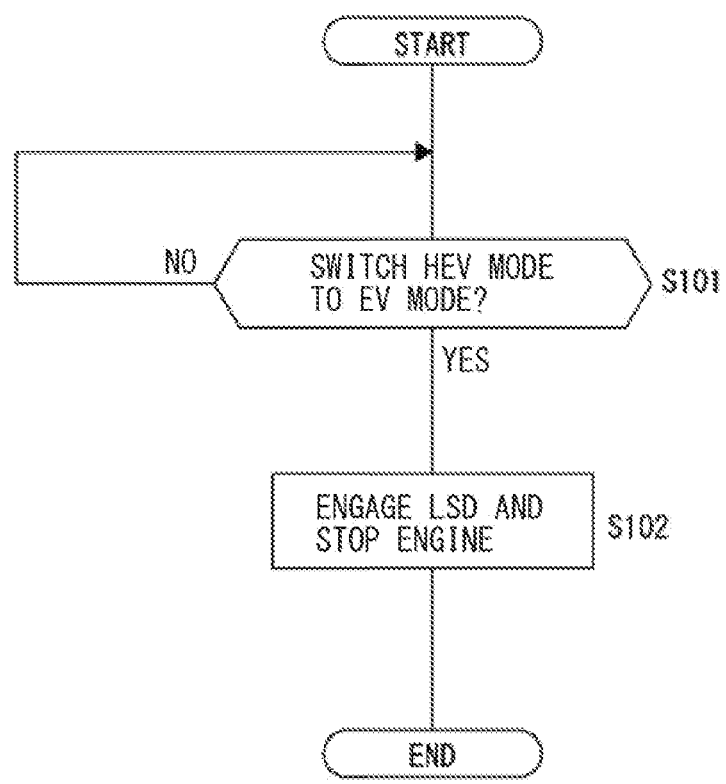
FIG. 7 is a flowchart of an exemplary process for switching the vehicle from the HEV mode to the EV mode.
Figure 8:
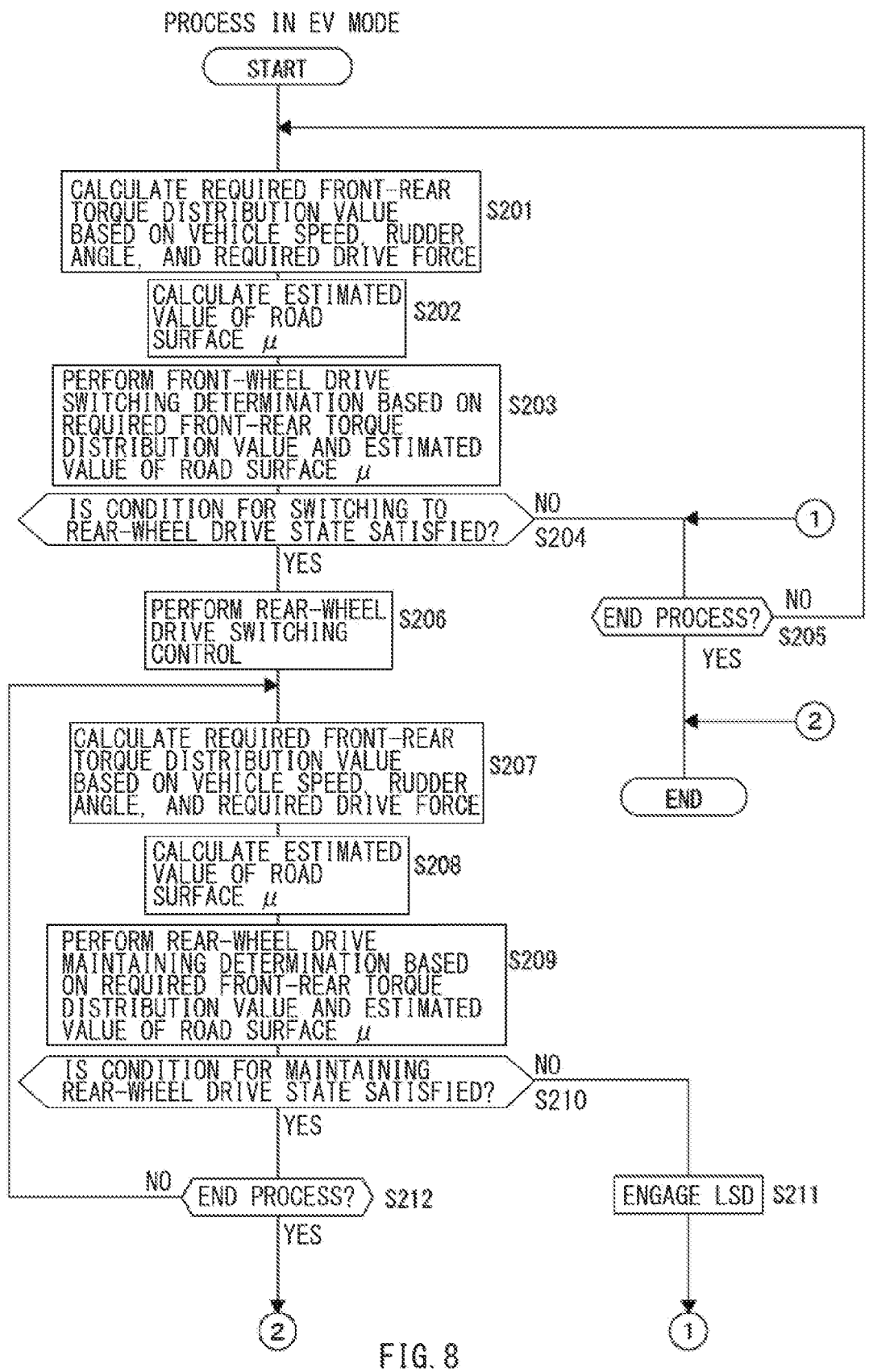
FIG. 8 is a flow chart of an exemplary process performed in the EV mode.

The processes illustrated in FIGS. 7 and 8 may be performed by the HEV processor 2 on the basis of programs stored in a predetermined memory, such as a ROM.

FIG. 7 is a flowchart illustrating the process for switching from the HEV mode to the EV mode.

First, in Step S101, the HEV processor 2 may determine whether the HEV mode is to be switched to the EV mode. The determination may be made on the basis of at least the vehicle speed and the required drive force. As illustrated in FIG. 7, if it is not determined that the HEV mode is to be switched to the EV mode (Step S101: NO), the HEV processor 2 may repeat the determination at Step S101.

In contrast, if it is determined that the HEV mode is to be switched to the EV mode (Step S101: YES), the HEV processor 2 may cause the process to proceed to Step S102. In Step S102, the HEV processor 2 may engage the LSD 32 and then stop the engine 21. For example, the HEV processor 2 may cause the LSD-related actuator 33 illustrated in FIG. 1 to engage the multiple disc clutch of the LSD 32, and then send the engine processor 3 a command to stop the engine 21. In this example, the HEV processor 2 may bring the LSD 32 into the completely engaged state so that the front-wheel-side output portion and the rear-wheel-side output portion of the center differential 31 are directly coupled to each other, and then stop the engine 21.

After performing Step S102, the HEV processor 2 may end the process illustrated in FIG. 7.

Note that the clutch mechanism 23 illustrated in FIG. 1 may be switched from the engaged state to the released state when the HEV mode is switched to the EV mode.

FIG. 8 is a flowchart illustrating an exemplary process performed in the EV mode.

First, in Step S201, the HEV processor 2 may calculate the required front-rear torque distribution value on the basis of the vehicle speed, the rudder angle, and the required drive force. The required front-rear torque distribution value may be calculated by the method described above with reference to FIG. 6. Hereinafter, the detailed description of the calculation method is not repeated to avoid duplicated explanation.

After Step S201, the HEV processor 2 may calculate the estimated value of the road surface μ in Step S202. The estimated value of the road surface μ may be calculated by the method described above. Hereinafter, the detailed description of the calculation method is not repeated to avoid duplicated explanation.

After Step S202, the HEV processor 2 may perform the rear-wheel drive switching determination on the basis of the required front-rear torque distribution value and the estimated value of the road surface μ in Step S203. In this example, the HEV processor 2 may determine to switch the vehicle 20 to the rear-wheel drive state under the condition that the rear-wheel drive power distribution (%) required to satisfy the required front-rear torque distribution value is greater than or equal to a predetermined value (e.g., 30% or greater) and that the estimated value of the road surface μ is greater than or equal to a predetermined value (e.g., 0.7 or greater).

After Step S203, the HEV processor 2 may determine whether the condition for switching is determined to be satisfied in Step S203 (Step S204).

If the condition for switching is determined to be satisfied (Step S204: YES), the HEV processor 2 may cause the process to proceed to Step S206. In Step S206, the HEV processor 2 may perform the rear-wheel drive switching control. For example, the HEV processor 2 may gradually release the multiple disc clutch of the LSD 32 so that the differential between the front-wheel-side output portion and the rear-wheel-side output portion of the center differential 31 is not limited. As a result, the front-rear torque distribution may become 0:100.

In contrast, if the condition for switching is not determined to be satisfied (Step S204: NO), the HEV processor 2 may cause the process to proceed to Step S205. In Step S205, the HEV processor 2 may determine whether to end the process. In the determination, the HEV processor 2 may determine whether a predetermined requirement for ending the process in the EV mode illustrated in FIG. 8 is satisfied. For example, the requirement for ending the process in the EV mode may be satisfied when it is determined to switch the EV mode to the HEV mode.

If the process is determined to be ended in Step S205 (Step S205: YES), the HEV processor 2 may end the process in the EV mode illustrated in FIG. 8.

In contrast, if the process is not determined to be ended (Step S205: NO), the HEV processor 2 may return the process to Step S201. Accordingly, after the vehicle 20 is switched to the EV mode, the rear-wheel drive switching control is not performed until the end of the process unless the condition for switching to the rear-wheel drive state is satisfied.

After performing the rear-wheel drive switching control in Step S206, the HEV processor 2 may perform the rear-wheel drive maintaining determination in Step S207 and the subsequent steps.

For example, in Step S207, the HEV processor 2 may calculate the required front-rear torque distribution value on the basis of the vehicle speed, the rudder angle, and the required drive force. Thereafter, in Step S208, the HEV processor 2 may calculate the estimated value of the road surface μ. Step S207 may be performed in the same manner as in Step S201, and Step S208 may be performed in the same manner as in Step S202.

After Step S208, the HEV processor 2 may perform the rear-wheel drive maintaining determination on the basis of the required front-rear torque distribution value and the estimated value of the road surface μ in Step S209. In the rear-wheel drive maintaining determination, the HEV processor 2 may determine whether a condition for maintaining the rear-wheel drive state is satisfied. The condition for maintaining the rear-wheel drive state may be the same as the condition for switching to the rear-wheel drive state used in Step S203 described above.

Alternatively, the condition for maintaining the rear-wheel drive state may be set by partly modifying the condition for switching to the rear-wheel drive state.

After Step S209, the HEV processor 2 may determine whether the condition for maintaining the rear-wheel drive state is determined to be satisfied it in Step S209 (Step S210).

If it the condition for maintaining the rear-wheel drive state is determined to be satisfied (Step S210: YES), the HEV processor 2 may cause the process to proceed to Step S212. In Step S212, the HEV processor 2 may determine whether to end the process. The determination in Step S212 may be performed in the same manner as in the determination in Step S205.

If the process is determined to be ended in Step S212 (Step S212: YES), the HEV processor 2 may end the process in EV mode illustrated in FIG. 8. In contrast, if the process is not determined to be ended in Step S212 (Step S212: NO), the HEV processor 2 may return the process to Step S207.

Accordingly, the HEV processor 2 may determine whether the condition for maintaining the rear-wheel drive state is satisfied every time after the vehicle 20 is switched to the rear-wheel drive state until the end of the process. The rear-wheel drive state may be maintained as long as the condition for maintaining the rear-wheel drive state is satisfied.

In contrast, if the condition for maintaining the rear-wheel drive state is not determined to be satisfied (Step S210: NO), the HEV processor 2 may cause the process to proceed to Step S211. In Step S211, the HEV processor 2 may bring the LSD 32 into the engaged state (e.g., the completely engaged state), and then cause the process to proceed to Step S205 described above.

Accordingly, if the condition for maintaining the rear-wheel drive state is not satisfied after the vehicle is switched to the rear-wheel drive state, the HEV processor 2 may switch the vehicle 20 from the rear-wheel drive state to the all-wheel-drive state. After the vehicle 20 is switched to the all-wheel drive state, Steps S201 to S204 described above may be performed until the end of the process. If the condition for switching to the rear-wheel drive state is satisfied, the rear-wheel drive switching control may be performed in Step S206, so that the vehicle 20 is switched to the rear-wheel drive state.

In the example illustrated in FIG. 8, the required front-rear torque distribution value may be calculated prior to the estimated value of the road surface μ. However, the estimated value of the road surface μ may be calculated prior to the required front-rear torque distribution value.

Further, in the example illustrated in FIG. 8, the rear-wheel drive switching determination and the rear-wheel drive maintaining determination may be made on the basis of both of the required front-rear torque distribution value and the estimated value of the road surface μ. However, one or both of the rear-wheel drive switching determination and the rear-wheel drive maintaining determination may be made on the basis of at least either one of the required front-rear torque distribution value and the estimated value of the road surface μ.

It should be appreciated that the foregoing example embodiments are non-limiting examples, and various modifications may be made.

For example, in the foregoing example embodiments, the vehicle is unconditionally maintained in the all-wheel drive state when switched from the HEV mode to the EV mode. However, in some cases, the driver is unlikely to feel strange on drivability even if the all-wheel drive state is switched to the rear-wheel drive state. For example, the driver is presumed to be unlikely to feel strange on drivability in a case where the all-wheel drive state is switched to the rear-wheel drive state while the vehicle 20 is traveling straight.

Figure 9:
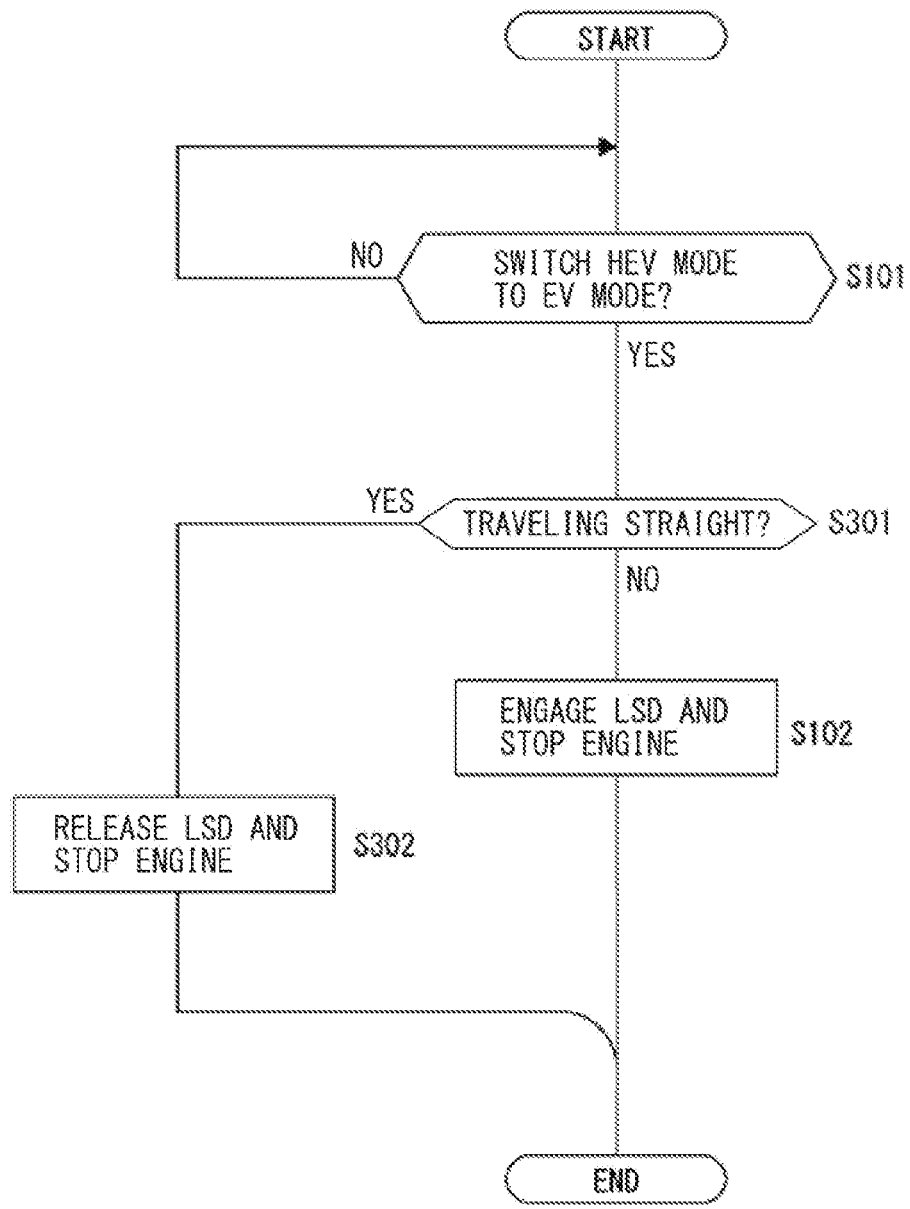
FIG. 9 is a flowchart of an exemplary process for switching the vehicle from the HEV mode to the EV mode according to a modification example.

According to a modification example, the HEV processor 2 may determine whether the vehicle 20 is traveling straight (Step S301), as illustrated in the flowchart of FIG. 9, for example. If the vehicle 20 is traveling straight (Step S301: YES), the HEV processor 2 may release the LSD 32 to switch the vehicle 20 to the rear-wheel drive state.

For example, the HEV processor 2 may determine or estimate whether the vehicle 20 is traveling straight in Step S301 after determining to switch the vehicle 20 to the EV mode (Step S101: YES). The estimation as to whether the vehicle 20 is traveling straight may be made on the basis of the data on the rudder angle, the yaw rate, and the lateral acceleration rate, for example. Further, the estimation as to whether the vehicle 20 is traveling straight may be made on the basis of an image of the traveling road of the vehicle 20 captured by the camera.

If it is determined that the vehicle 20 is traveling straight (Step S301: YES), the HEV processor 2 may cause the process to proceed to Step S302. In Step S302, the HEV processor 2 may release the LSD 32 and then stop the engine 21.

In contrast, if it is not determined that the vehicle 20 is traveling straight (Step S301: NO), the HEV processor 2 may cause the process to proceed to Step S102. In Step S102, the HEV processor 2 may engage the LSD 32 and then stop the engine 21.

Through the steps described above, it may be determined whether the vehicle 20 is traveling straight when the HEV mode is switched to the EV mode. If the vehicle 20 is traveling straight, the vehicle 20 may be immediately switched from the all-wheel drive state to the rear-wheel drive state. If the vehicle 20 is not traveling straight, the vehicle 20 may be maintained in the all-wheel drive state and then switched to the rear-wheel drive state under the rear-wheel drive switching control.

In the foregoing example embodiments, the required front-rear torque distribution value, and the estimated value of the road surface μ may be used only in the rear-wheel drive switching determination and the rear-wheel drive maintaining determination. However, the required front-rear torque distribution value and the estimated value of the road surface μ may be used to adjust the degree of eccentricity of the rear wheels in the EV mode.

In the foregoing example embodiments, the center differential 31 may be a planetary gear differential mechanism. However, the center differential 31 may be of another type, such as a clutch differential mechanism.

Further, the limited slip differential (LSD) mechanism of the center differential 31 should not be limited to the hydraulically-driven multiple-disc clutch differential described above. Alternatively, the LSD mechanism of the center differential 31 may be of another type, such as an electromagnetically-driven type.

The vehicle control system (1) according to any one of the foregoing example embodiments is to be mounted in a hybrid electric vehicle including: a center differential (31) configured to distribute the torque outputted from the engine (21) to the front wheels and the rear wheels; the limited slip differential mechanism (LSD 32) configured to limit the differential between the front-wheel-side output portion and the rear-wheel-side output portion of the center differential; the motor (motor generator 25) disposed in the drive-power transferring system configured to transfer drive power from the rear-wheel-side output portion to the rear wheel. The vehicle control system includes a processor (HEV processor 2) configured to, when the hybrid electric vehicle is switched from a first traveling mode in which the engine and the motor are both used as drive sources to a second traveling mode in which only the motor out of the engine and the motor is used as a drive source, stop the engine while causing the limited slip differential mechanism to limit the differential between the front-wheel-side output portion and the rear-wheel-side output portion.

This allows the vehicle to be maintained in the all-wheel drive state even when the first traveling mode (i.e., the HEV mode) is switched to the second traveling mode (i.e., the EV mode) by stopping the engine.

Accordingly, it is possible to suppresses a decrease in drivability of a hybrid electric vehicle that drives the rear wheels using the motor, at the time of switching from the HEV mode to the EV mode.

Further, the vehicle control system according to at least one of the foregoing example embodiments may stop the engine while causing the limited slip differential mechanism to limit the differential between the front-wheel-side output portion and the rear-wheel-side output portion, and thereafter perform the rear-wheel drive switching control to switch the hybrid electric vehicle to the rear-wheel drive state by relaxing the differential limited by the limited slip differential mechanism.

This allows the vehicle to be maintained in the all-wheel drive state even when the HEV mode is switched to the EV mode, and then gradually switched to the rear-wheel drive state.

Accordingly, it is possible to improve the power economy by reducing the number of wheels to be driven in the EV mode while suppressing a decrease in drivability at the time of switching from the HEV mode to the EV mode.

Further, in at least one of the foregoing example embodiments where the clutch mechanism is used as the limited slip differential mechanism, the abrasion of the clutch plate is suppressed, resulting in a longer service life of the limited slip differential mechanism.

Further, the processor of the vehicle control system according to at least one of the foregoing example embodiments may perform the rear-wheel drive switching control on the basis of the result of the estimation of the road surface condition.

This allows the rear-wheel drive switching control to be appropriately performed depending on road surface conditions. For example, in a condition where the road surface is estimated to be skiddy, the all-wheel drive state may be maintained or the degree of eccentricity of the rear wheels is reduced.

Accordingly, it is possible to enhance the safety of driving the vehicle.

Further, the processor of the vehicle control system according to at least one of the foregoing example embodiments may determine whether to perform the rear-wheel drive switching control on the basis of the result of the estimation of the road surface condition.

This allows the vehicle to be maintained in the the all-wheel drive state without being switched to the rear-wheel drive state when the road surface is estimated to be skiddy.

Accordingly, it is possible to enhance the safety of driving the vehicle.

Further, the processor of the vehicle control system according to at least one of the foregoing example embodiments may calculate the required front-rear torque distribution value on the basis of the data indicating the traveling state of the hybrid electric vehicle, and perform the rear-wheel drive switching control on the basis of the required front-rear torque distribution value. The required front-rear torque distribution value may be a value required in the distribution of the torque between the front wheels and the rear wheels.

This allows the rear-wheel drive switching control to be appropriately performed depending on the required value in the torque distribution. For example, when the torque required for the rear wheels is low, the vehicle is prevented from being switched to the rear-wheel drive state, or the degree of eccentricity of the rear wheels is reduced depending on the required torque distribution.

Accordingly, it is possible to appropriately perform the torque distribution control in the EV mode depending on the state of the vehicle.

Further, the processor of the vehicle control system according to at least one of the foregoing example embodiments may determine whether the hybrid electric vehicle is traveling straight when the first traveling mode is switched to the second traveling mode. In a case where the processor determines that the hybrid electric vehicle is traveling straight, the processor may stop the engine while causing the limited slip differential mechanism not to limit the differential between the front-wheel-side output portion and the rear-wheel-side output portion and.

The driver is unlikely to fell strange on drivability when the all-wheel drive state is switched to the rear-wheel drive state while the vehicle is traveling straight. Thus, when the vehicle is traveling straight, the all-wheel drive state is not maintained. Instead, the vehicle may be switched to the rear-wheel drive state without limiting the differential between the front-wheel-side output portion and the rear-wheel-side output portion.

This helps prevent the differential limitation from being performed to maintain the all-wheel drive state every time the HEV mode is switched to the EV mode. Accordingly, it is possible to reduce the number of executions of the differential limitation, resulting in a longer service life of the limited slip differential mechanism.

The HEV processor 2 in the vehicle control system 1 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the HEV processor 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the HEV processor 2 in the vehicle control system 1 illustrated in FIG. 2.

The invention claimed is:

1. A vehicle control system to be mounted in a hybrid electric vehicle, the hybrid electric vehicle including:
    an engine;
    a center differential including a front-wheel-side output portion and a rear-wheel-side output portion and configured to distribute torque outputted from the engine to a front wheel and a rear wheel;
    a limited slip differential mechanism configured to limit a differential between the front-wheel-side output portion and the rear-wheel-side output portion; and
    a motor disposed in a drive-power transferring system configured to transfer drive power from the rear-wheel-side output portion to the rear wheel,
    the vehicle control system comprising
    a processor configured to, when the hybrid electric vehicle is switched from a first traveling mode in which the engine and the motor are both used as drive sources to a second traveling mode in which only the motor out of the engine and the motor is used as a drive source, stop the engine while causing the limited slip differential mechanism to limit the differential between the front-wheel-side output portion and the rear-wheel-side output portion.

2. The vehicle control system according to claim 1, wherein
    the processor is configured to stop the engine while causing the limited slip differential mechanism to limit the differential between the front-wheel-side output portion and the rear-wheel-side output portion, and thereafter perform rear-wheel drive switching control to switch the hybrid electric vehicle to a rear-wheel drive state by relaxing the differential limited by the limited slip differential mechanism.

3. The vehicle control system according to claim 2, wherein
    the processor is configured to perform the rear-wheel drive switching control on a basis of a result of an estimation of a road surface condition.

4. The vehicle control system according to claim 3, wherein
    the processor is configured to determine whether to perform the rear-wheel drive switching control on a basis of the result of the estimation of the road surface condition.

5. The vehicle control system according to claim 2, wherein
    the processor is configured to
    calculate a required front-rear torque distribution value on a basis of data indicating a traveling state of the hybrid electric vehicle, the required front-rear torque distribution value comprising a value required in distribution of the torque between the front wheel and the rear wheel, and
    perform the rear-wheel drive switching control on a basis of the required front-rear torque distribution value.

6. The vehicle control system according to claim 3, wherein
    the processor is configured to
    calculate a required front-rear torque distribution value on a basis of data indicating a traveling state of the hybrid electric vehicle, the required front-rear torque distribution value comprising a value required in distribution of the torque between the front wheel and the rear wheel, and
    perform the rear-wheel drive switching control on a basis of the required front-rear torque distribution value.

7. The vehicle control system according to claim 4, wherein
    the processor is configured to
    calculate a required front-rear torque distribution value on a basis of data indicating a traveling state of the hybrid electric vehicle, the required front-rear torque distribution value comprising a value required in distribution of the torque between the front wheel and the rear wheel, and
    perform the rear-wheel drive switching control on a basis of the required front-rear torque distribution value.

8. The vehicle control system according to claim 1, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

9. The vehicle control system according to claim 2, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

10. The vehicle control system according to claim 3, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

11. The vehicle control system according to claim 4, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

12. The vehicle control system according to claim 5, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

13. The vehicle control system according to claim 6, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

14. The vehicle control system according to claim 7, wherein the processor is configured to
    determine whether the hybrid electric vehicle is traveling straight when the hybrid electric vehicle is switched from the first traveling mode to the second traveling mode, and
    stop the engine while causing the limited slip differential mechanism not to limit the differential between the front-wheel-side output portion and the rear-wheel-side output portion in a case where the hybrid electric vehicle is determined to be traveling straight.

\* \* \* \* \*